United States Patent [19]

Vogelgesang et al.

[11] Patent Number: 5,293,732

[45] Date of Patent: Mar. 15, 1994

[54] CROP HOLD DOWN ARRANGEMENT FOR PICK-UP

[75] Inventors: Claus-Josef Vogelgesang, Mandelbachtal; Jann D. Frieling, Uplengen, both of Fed. Rep. of Germany

[73] Assignee: Deere & Company, Moline, Ill.

[21] Appl. No.: 928,833

[22] Filed: Aug. 11, 1992

[30] Foreign Application Priority Data

Aug. 16, 1991 [DE] Fed. Rep. of Germany ....... 4127155

[51] Int. Cl.$^5$ ..................... A01D 89/00; A01D 57/03
[52] U.S. Cl. ......................... 56/16.4; 56/364; 56/119
[58] Field of Search ............ 56/16.4, 16.5, 16.6, 56/14.3, 347, 372, 365, 367, 364, 119

[56] References Cited

U.S. PATENT DOCUMENTS

| | | | |
|---|---|---|---|
| 2,524,233 | 10/1950 | Russell | 56/364 |
| 3,747,313 | 7/1973 | Denzin | 56/364 |
| 4,015,410 | 4/1977 | Smith | 56/364 |
| 4,411,127 | 10/1983 | Diederich, Jr. et al. | 56/364 |
| 4,495,756 | 1/1985 | Greiner et al. | 56/364 |
| 4,841,718 | 6/1989 | Sund | 56/364 |
| 5,090,187 | 2/1992 | Mews | 56/364 |

FOREIGN PATENT DOCUMENTS

| | | |
|---|---|---|
| 3922695 | 12/1990 | Fed. Rep. of Germany . |
| 1220511 | 1/1971 | United Kingdom ............... 56/347 |

*Primary Examiner*—Stephen J. Novosad

[57] ABSTRACT

A crop hold down arrangement for a pick-up comprises a roll supported by means of pivot arms from the frame so as to enable the arms to pivot vertically and guide the roll in the direction of crop being fed by a tined pick-up drum to a conveyor in response to an increase in the height of a crop windrow being picked up. A chain is provided between the frame and roll-support arm to limit the downward travel of the arm so as to keep the roll from interfering with the tined pick-up drum. A spring assembly is provided for counterbalancing at least a portion of the weight of the arm and roll assembly so that the roll will easily rise over a relatively light and fluffy crop windrow.

7 Claims, 2 Drawing Sheets

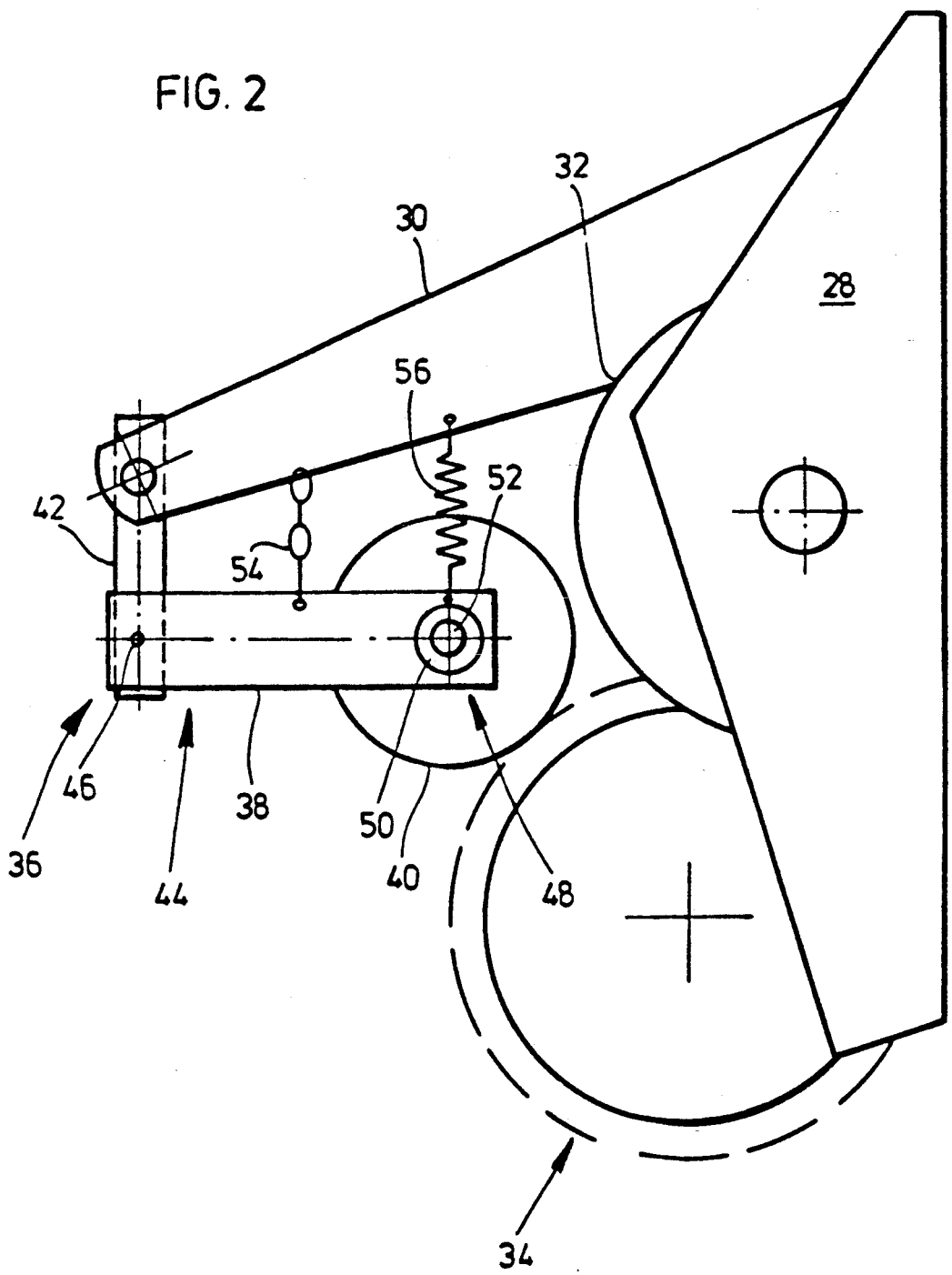

CROP HOLD DOWN ARRANGEMENT FOR PICK-UP

BACKGROUND OF THE INVENTION

The invention concerns a crop hold down arrangement for a feeder implement, such as a pick-up that contains a rotating feeder and a conveyor arrangement, with a frame and a rotating roll, whose axis extends parallel to the axes of the feeder and/or the conveyor arrangement.

Hold down arrangements are conventionally used on feeder implements, such as pick-up mechanisms, in order to limit the upward movement of crop to be lifted by the feeder and to conduct it safely to a conveyor arrangement. Known hold down arrangements contain curved rods or prongs, along whose underside the crop, such as straw or hay, can slide. U.S. Pat. Nos. 4,411,127 and 4,495,756 disclose examples of such arrangements.

Beyond that a hold down arrangement is known from U.S. Pat. No. 4,015,410, that contains a rotating roll on a vertically pivoted frame. Due to the attitude of the frame, the roll is retained at a small distance from the ground, presses the windrow lying there flat and forms a gap with a tined pick-up drum, through which the crop is guided to the conveyor arrangement. This hold down arrangement has the disadvantage that it can escape upward upon changes in the height of the windrow only under high pressure and steadily increasing height of the windrow, and thereby, on occasion, pushes the crop ahead of itself, which can lead to disruption in the supply of the crop.

In a further hold down arrangement, according to German published application 39 22 695, two rolls precede the pick-up drum and the conveyor arrangement and are attached rigidly in a vertical direction. This hold down arrangement has the disadvantage that variations in the height of the windrow can also lead to stoppages and if the conveyor is reversed in order to clear a blockage, the ejected crop does not find enough space to exit.

SUMMARY OF THE INVENTION

According to the present invention, there is provided an improved hold down arrangement for a feeder implement, such as a pick-up.

A broad object of the invention is to provide a hold down arrangement which avoids clogging even when picking up unevenly deposited crop.

A more specific object of the invention is to provide a hold down arrangement for a feeder implement, the hold down arrangement including a roll which is carried by an arm that is pivotally connected so as to move in the direction of movement of crop toward a conveying element of the feeder implement if the height of the deposited crop should vary considerably.

Yet another object of the invention is to provide a roll, as set forth in the previous object, to which a counterbalance spring may be attached for removing the influence of its weight on crop passing therebeneath, especially when the crop is relatively light and resilient.

These and other objects will become apparent from a reading of the ensuing description together with the appended drawings.

BRIEF DESCRIPTION OF THE DRAWING

FIG. 2 shows the hold down arrangement with a portion of the feeder implement.

DESCRIPTION OF THE PREFERRED EMBODIMENT

Figure 1:
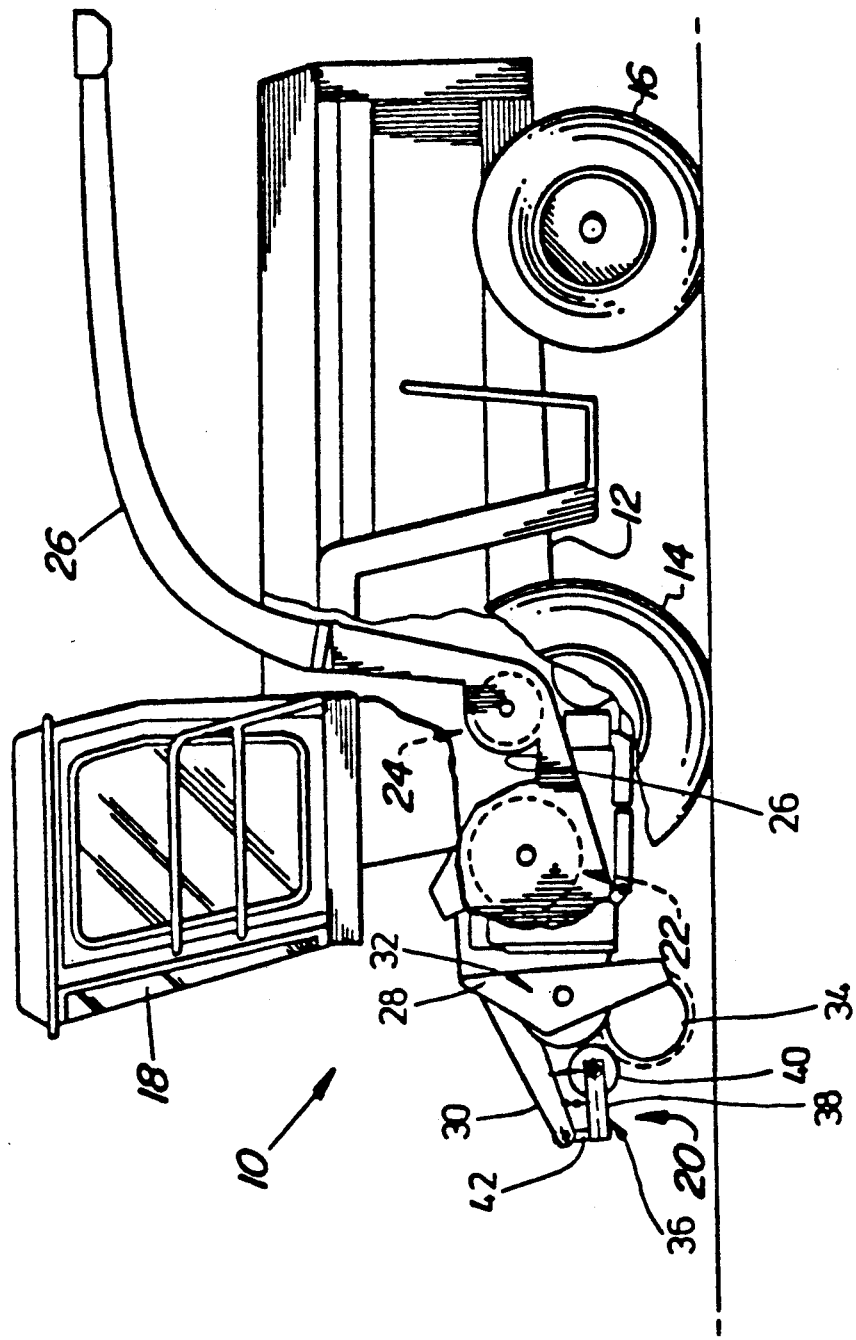
FIG. 1 shows a harvesting machine with a feeder implement and a hold down arrangement constructed in accordance with the principles of the present invention.

FIG. 1 shows a harvesting machine 10 in the form of a self-propelled forage harvester having a chassis 12, that is supported on front and rear wheels 14, 16 so as to be able to move over the ground. The harvesting machine 10 is controlled from an operator's cab 18, from which a feeder implement 20 mounted at the front end of the harvesting machine 10 can be viewed. The feeder implement 20 takes up crop from the ground and delivers it to a chopper assembly 22 that cuts it into smaller pieces and conducts it to an impeller arrangement 24 for delivery through an outlet spout 26.

While in this embodiment, the feeder implement is configured as a so-called pick-up of a self-propelled forage harvester, it is to be noted that the pick-up 20 can also be used with a pull-type forage harvester, or another category of harvester, such as a combine or a baler. When used with a combine, the pick-up may be arranged as an accessory that is attached to a flange adjacent the feeder house of the combine.

In any event, the pick-up 20 includes a body 28, a frame 30, a conveying arrangement 32, a feeder 34 and a hold down arrangement 36 according to the invention with a pivot arm 38 and a roll 40. Although not shown, the pick-up 20 may be supported by support wheels on the ground. Further details, in particular that of the hold down arrangement 36 are revealed in FIG. 2 and the associated description.

The task of the pick-up 20 consists of taking up crop deposited on the ground in windrows which is of varied types and conditions, and to conduct it to the harvesting machine 10 for further processing. The crop may include grass, wilted silage, grain crops and other feed crops, which may be wet or damp as well as very dry and brittle. For this purpose the feeder implement 20 is moved during the operation at a small distance from the ground, while it is raised for transport on roads or paths.

The body 28 is a weldment that supports the conveyor arrangement 32 and the feeder 34 so that they are powered and can rotate, and that can be disassembled from the chassis 12 of the harvesting machine 10.

The frame 30 is rigidly attached to the upper region of the body 28 and extends from there forward to a point considerably beyond the feeder 34. The frame 30 can be configured as a U-shaped structure from hollow sections, whose legs engage the body 28 and are joined at their forward ends to a cross member that extends perpendicular to the direction of travel above and ahead of the feeder 34. In its forward end region the frame 30 contains two brackets 42 that extend, in general, vertically downward, with the two brackets 42 being respectively located on each side of the feeder implement 20 with respect to its longitudinal centerline. Instead of the rigid attachment of the frame 30 to the body 28, a hinge or a pin connection could be provided, that makes it possible to bring the frame 30 into a non-operating position or to remove it entirely.

The conveyor arrangement 32 is located in the rear, upper region of the pick-up 20 and is configured as a screw conveyor, which moves the crop in known manner from the sides of the feeder implement 20 to a central outlet opening, not shown. The rotational axis of the conveyor 32 extends generally parallel to the ground and perpendicular to the direction of travel of the harvesting machine 10. The conveyor 32 is driven by means not shown.

The feeder 34 is a tined pick-up drum, also of conventional configuration, and hence does not require any detailed description. What is significant is that the feeder 34 is located below the roll 40 and the conveyor arrangement 32 and that its longitudinal axis extends generally perpendicular to the direction of travel and parallel to the ground. The feeder 34 is also powered by means not shown, and raises the crop from the ground with its conveying tines or prongs in order to transfer it to the conveyor arrangement 32. The relative position of the conveyor arrangement 32 to the feeder 34 is fixed.

The present invention resides in the manner of mounting the hold down arrangement 36. Specifically, the hold down arrangement 36 is mounted on the brackets 42 of the frame 30 so as to pivot vertically and is designed to compress slightly the crop to be picked up and to hold it securely in contact with the feeder 34 which then picks it up.

In this embodiment of the hold down arrangement 36 a total of two pivot arms 38 are provided, however, depending on the configuration of the embodiment, a single pivot arm 38 may be sufficient. On the other hand, with very wide rolls 40, two or three pivot arms 38 may be required.

Each pivot arm 38 has its front end 44 connected, as by a horizontal pivot pin 46 to a bracket 42, to enable the arm to pivot vertically. Each pivot arm 38 has its rear end 48 provided with a spherical bearing 50 or a rocker bearing receiving and establishing a rotatable mounting for a shaft 52 of the roll 40.

Connected between the frame 30 and each arm 38, at a location between the rear and front ends 48, 44, is a motion limiting device 54, here shown as a chain of a certain length which prevents the pivot arms 38 from moving too far downward, so as to prevent the roll 40 from coming into contact with the feeder 34. The motion limiting device 54 could also be used to retain the arm 38 in a substantially fixed position so as to prevent the arm 38 from bouncing during transport.

Above the bearing 50, a spring device 56 in the form of a mechanical helical extension spring has its lower end coupled to each pivot arm 38 and its upper end coupled to the frame 30. This spring device 56 counterbalances the weight of the hold down arrangement 36, so that the roll 40 does not apply its full weight to the crop being picked up. The spring device 56 could also be any other type of mechanical spring or a plastic means of applying tension. Similarly a pneumatic spring could be used as spring device 56.

The pivot pin 46 is located ahead of the bearing 50 of each pivot arm 38 so that the pivot arms 38 with their rear ends 48 and the roll 40 carried at that end can be easily raised by the crop passing beneath the roll 40.

The roll 40 is supported in such a way that half its diameter covers the feeder 34 in the vertical direction; this can be determined by the selection of the length of the pivot arms 38 as well as the position of the bearing 50 on the arm. The shape of the roll 40 corresponds to a round cylinder whose longitudinal axis extends perpendicular to the direction of travel of the harvesting machine 10. Its longitudinal axis is located vertically between that of the feeder 34 and the conveyor arrangement 32, with the outer circumference of the roll being spaced ahead of the outer circumference of the conveyor arrangement. This location of the hold down roll 40 permits crop to be discharged over the top of the roll when the conveyor 32 is reversed to unplug the pick-up. The outer circumference of the roll 40 is coated with a lining having a high coefficient of friction, to insure that the non-powered roll 40 is brought into rotation by the crop as soon as it is in contact with the latter. To further enhance the ability of the roll 40 to rotate upon being contacted by crop passing therebeneath, the roll could be made to have other than a cylindrical outer contour. For example, the roll 40 could be fashioned to have a three-, four-, five, six- or eight-sided outer contour.

We claim:

1. In a crop pick-up including a body rotatably supporting a tined pick-up drum and a conveyor arrangement for rotation about parallel axes extending perpendicular to a direction of travel of the pick-up with the conveyor being located behind and above said drum so as to receive a window of crop picked up and fed by said drum, and a frame joined to and, with reference to said direction of travel, extending forwardly from said body to a location above and ahead of said pick-up drum and an arm having a forward end end connected to said frame at said location and having a rearward end supporting a roll adjacent an upper forward location of the pick-up drum and a lower forward location of said conveyor for rotation about an axis extending parallel to the rotational axes of the pick-up drum and conveyor, the improvement comprising: connection means coupling said forward end of said arm to said frame for permitting said roll to undergo upward or downward motion respectively in response to an increase or decrease in height of the windrow being picked up and passing between said pick-up drum and roll.

2. The pick-up defined in claim 1 wherein said connection means defines a pivotal connection between the arm and the frame at a location ahead of the rotational axis of the roll with respect to the direction of travel of the pick-up.

3. The pick-up defined in claim 1 wherein said connection means includes counterbalance spring means coupled between the frame and the roll for counterbalancing the weight of the roll and arm.

4. The pick-up defined in claim 1 wherein said connection means includes a motion-limiting device that is provided between the arm and the frame for preventing the roll from moving into engagement with said pick-up drum.

5. The pick-up defined in claim 1 wherein the axial length of the roll is less than that of the pick-up drum.

6. The pick-up defined in claim 1 wherein the roll has a top which is approximately at a height that is equal to that of the rotational axis of said conveyor, whereby crop will pass over said roll in the event said conveyor is reversed to clear a blockage.

7. The pick-up defined in claim 2 wherein said roll has a periphery which is ahead of the conveyor and which extends above and overlaps only a forward portion of the pick-up drum.

* * * * *